(12) United States Patent
Tezuka

(10) Patent No.: US 6,432,858 B1
(45) Date of Patent: Aug. 13, 2002

(54) PROCESS FOR THE REGENERATION OF HYDRATION CATALYST FOR CYCLIC OLEFINS

(75) Inventor: Makoto Tezuka, Fukuoka (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 09/463,382

(22) PCT Filed: Jul. 25, 1997

(86) PCT No.: PCT/JP97/02584

§ 371 (c)(1), (2), (4) Date: Jan. 27, 2000

(87) PCT Pub. No.: WO99/04902

PCT Pub. Date: Feb. 4, 1999

(51) Int. Cl.⁷ ............................ B01J 20/34; B01J 29/04; B01J 29/06; C07C 29/04
(52) U.S. Cl. ............................ 502/22; 502/62; 502/64; 568/895
(58) Field of Search .................. 502/22, 64, 62; 568/895

(56) References Cited

U.S. PATENT DOCUMENTS

| | | | | |
|---|---|---|---|---|
| 4,507,512 A | * | 3/1985 | Okumura et al. | 568/897 |
| 4,661,639 A | * | 4/1987 | Tojo et al. | 568/835 |
| 5,508,244 A | * | 4/1996 | Watanabe et al. | 502/64 |
| 5,681,789 A | * | 10/1997 | Saxton et al. | 502/85 |

FOREIGN PATENT DOCUMENTS

| | | | | |
|---|---|---|---|---|
| JP | 3-224632 | 10/1991 | | |
| JP | 5-97736 | 4/1993 | | |
| JP | 07171402 | 7/1995 | | |
| JP | 07171402 A | * 7/1995 | ............ | B01J/29/90 |
| JP | 7-179381 | 7/1995 | | |
| JP | 9-12493 | 1/1997 | | |
| JP | 9-30999 | 2/1997 | | |
| JP | 9-85098 | 3/1998 | | |

* cited by examiner

Primary Examiner—Steven P. Griffin
Assistant Examiner—Jonas N. Strickland
(74) Attorney, Agent, or Firm—Oblon, Spivak, McClelland, Maier & Neustadt, P.C.

(57) ABSTRACT

This invention relates to a method for regenerating a cyclic olefin hydration catalyst, in which a solid acid catalyst is regenerated after its use in a hydration reaction of a cyclic olefin by mixing a water phase containing the solid acid catalyst and an oil phase containing the cyclic olefin and thereby effecting the reaction, which comprises separating the reaction solution into oil phase and water phase at a temperature of 40° C. or more and subsequently subjecting at least a portion of the solid acid catalyst in the separated water phase to a regeneration treatment. According to the method of this invention, a catalyst used in the hydration of a cyclic olefin can be separated and regenerated efficiently, and it is a particularly suitable catalyst regeneration method for a case in which hydration of a cyclic olefin is carried out for a prolonged period of time by repeating regeneration and use of the catalyst again and again.

18 Claims, 2 Drawing Sheets

PROCESS FOR THE REGENERATION OF HYDRATION CATALYST FOR CYCLIC OLEFINS

TECHNICAL FIELD

This invention relates to a regeneration method of catalyst. More particularly, it relates to a method for the regeneration of a solid acid catalyst which is used when various cyclic alcohols useful as intermediate raw materials are produced by hydrating cyclic olefins in a liquid phase.

BACKGROUND ART

It is known that a cyclic alcohol such as cyclohexanol is produced by effecting hydration of a cyclic olefin such as cyclohexene in a liquid phase in the present of a solid acid catalyst such as zeolite. For example, when zeolite is used as the catalyst and cyclohexene is used as the raw material, a water phase containing microgranular zeolite and an oil phase containing the raw material cyclohexene are allowed to react with each other under a suspended condition in a stirring tank, and most of the thus formed cyclohexanol is distributed in said oil phase.

When such a reaction is considered from the viewpoint of mass transfer, there is a phenomenon in which cyclohexene in the oil phase is transferred to zeolite via water in the water phase and undergoes hydration and then the thus formed cyclohexanol is transferred to the oil phase through the opposite path. However, this reaction causes a problem of accumulating by-products in zeolite.

In the aforementioned hydration of olefin in a liquid phase by a solid acid catalyst such as zeolite, organic substances are accumulated mainly on the catalyst with the progress of reaction, so that the activity of catalyst is gradually reduced. Examples of known methods for regenerating such a catalyst with reduced activity include a method in which it is heat-treated at a high temperature in the presence of molecular oxygen (JP-A-61-234946; the term "JP-A" as used herein means an "unexamined published Japanese patent application") and a method in which it is treated with a liquid phase oxidizing agent (JP-A-61-234945, JP-A-3-224633). However, the conventional regeneration methods have a problem in that recovery of the catalytic activity is insufficient. That is, though almost satisfactory recovery of the activity can be achieved at the initial stage of regeneration, reduction of the activity becomes significant as the regeneration is repeated.

The conventionally known techniques are merely aiming at the regeneration method itself for how to recover the catalytic activity and are not examined by connecting the activity recovery of catalyst with the improvement of the reaction process itself.

Regarding the aforementioned reaction process, JP-A-6-239780 describes that, in the hydration of a cyclic olefin using zeolite, a water phase and an oil phase are subjected to oil water separation inside or outside of a reactor, and the oil phase containing the reaction product is drawn out. However, the above known reference does not describe about temperature of the oil water separation or about regeneration of the separated catalyst.

DISCLOSURE OF THE INVENTION

The inventors of the present invention have conducted intensive studies on a catalyst regeneration method which causes extremely small reduction of catalyst activity even after repeated regeneration and use of a catalyst and found as a result of the efforts that, when a regeneration method having a step of effecting phase separation of an oil phase containing a cyclic olefin and its reaction product such as an alcohol and a water phase containing a catalyst, from the reaction mixture at a temperature of 40° C. or more is employed, the catalyst can be regenerated with higher efficiency than those of the conventional methods and the catalytic activity can be maintained at a high level even after the use of the catalyst for a prolonged period of time by repeating its regeneration, thus resulting in the accomplishment of the present invention.

Accordingly, the present invention relates to a method for regenerating a cyclic olefin hydration catalyst, in which a solid acid catalyst is regenerated after its use in a hydration reaction of a cyclic olefin by mixing a water phase containing the solid acid catalyst and an oil phase containing the cyclic olefin and thereby effecting the reaction, which comprises separating the reaction solution into oil phase and water phase at a temperature of 40° C. or more and subsequently subjecting at least a portion of the solid acid catalyst in said separated water phase to a regeneration treatment.

The present invention also relates to a method for producing a cyclic alcohol by carrying out continuous reaction of a cyclic olefin with water, which comprises the steps of:

(1) forming a reaction mixture by mixing a water phase containing a solid acid catalyst with an oil phase containing a cyclic olefin and a cyclic alcohol;

(2) drawing out the reaction mixture continuously from a reactor and carrying out oil water separation at a temperature of 40° C. or more; and (3) subjecting at least a portion of the solid acid catalyst in the water phase obtained by the oil water separation to a regeneration treatment.

The present invention also relates to a method for producing a cyclic alcohol by carrying out continuous reaction of a cyclic olefin with water, which comprises the steps of:

(1) forming a reaction mixture by mixing a water phase containing a solid acid catalyst with an oil phase containing a cyclic olefin and a cyclic alcohol in a reactor having an oil water separation function inside thereof;

(2) drawing out the oil phase separated in the reactor, continuously from the reactor;

(3) separately from the oil phase drawing of step (2), drawing out the reaction mixture continuously from the reactor and carrying out oil water separation at a temperature of 40° C. or more; and (4) subjecting at least a portion of the solid acid catalyst in the water phase obtained by the oil water separation of step (3) to a regeneration treatment.

The present invention also relates to a method for producing a cyclic alcohol by carrying out continuous reaction of a cyclic olefin with water, which comprises the steps of:

(1) mixing a water phase containing a solid acid catalyst with an oil phase containing a cyclic olefin and a cyclic alcohol, in a reactor having an oil water separation function inside thereof;

(2) drawing out the oil phase separated at a temperature of 40° C. or more in the reactor, continuously from the reactor;

(3) drawing out from the reactor, the water phase containing oil phase components, crudely separated at a temperature of 40° C. or more in the reactor;

(4) further carrying out oil water separation of the oil phase component-containing water phase drawn out from the reactor in step (3), at a temperature of 40° C. or more; and (5) subjecting at least a portion of the solid acid catalyst in the water phase obtained by the oil water separation of step (4), to a regeneration treatment.

BEST MODE OF CARRYING OUT THE INVENTION

Figure 1:
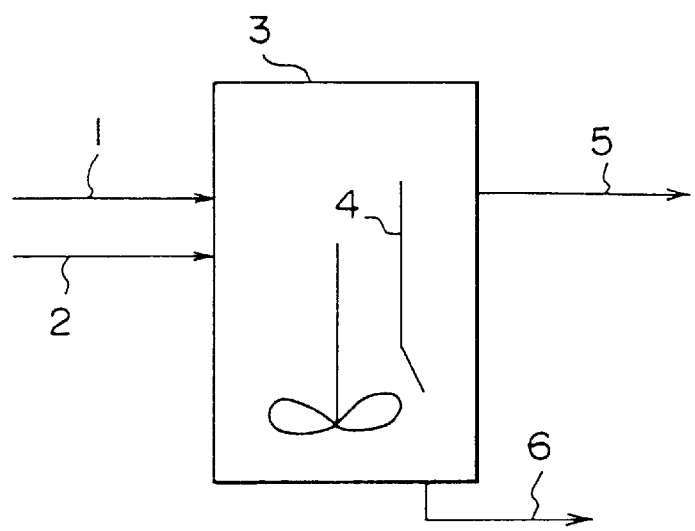
FIG. 1 is a schematic illustration showing the continuous hydration apparatus used in the examples, in which 1 is a raw material (cyclohexene) feed pipe, 2 is a water feed pipe, 3 is a reactor, 4 is an oil water separation weir, 5 is an overflow pipe and 6 is a reaction mixture output port.

The following describes the present invention in detail. The catalyst to be used in the present invention is a solid acid catalyst for use in the hydration of cyclic olefins. The solid acid catalyst is an acidic solid substance, and its examples include zeolite, a strongly acidic ion exchange resin containing sulfonate group or the like, an inorganic oxide such as hydrated niobium oxide, hydrated tantalum oxide, zirconium dioxide, titanium dioxide, aluminum oxide or silicon dioxide or a mixed oxide thereof, and an ion exchange type layered compound obtained by treating a layered compound such as smectite, kaolinite or vermiculite with at least one metal oxide selected from oxides of aluminum, silicon, titanium and zirconium, of which zeolite is particularly desirable as the solid acid catalyst of the present invention. In this connection, the solid acid catalyst may be used generally in the powder or granular form, though not particularly limited thereto. Also, alumina, silica, titania or the like compound may be used as a carrier or binder.

The type of said zeolite is not particularly limited with the proviso that it can be used as the catalyst, and crystalline zeolite can be cited as its examples, including aluminosilicates such as mordenite, faujasite, clinoptilite, L type zeolite, chabazite, erionite and ferrierite, as well as zeolite products ZSM-5, ZSM-4, ZSM-8, ZSM-11, ZSM-12, ZSM-20, ZSM-40, ZSM-35 and ZSM-48 manufactured by Mobile Corp., and hetero element-containing zeolite such as borosilicate, gallosilicate and ferroaluminosilicate. These zeolite may contain thorium, copper, silver, chromium, molybdenum, tungsten, titanium, zirconium, hafnium and the like metals. In addition, a proton exchange type (H type) zeolite is generally used, and a portion thereof may be exchanged with a cationic species selected from alkali elements such as Na, K and Li, alkaline earth elements such as Mg, Ca and Sr and group 8 elements such as Fe, Co, Ni, Ru and Pd.

Preferred zeolite is aluminosilicate or gallosilicate, and preferred crystal structure is pentasyl type.

Primary particle size of zeolite is generally 1 $\mu$m or less, preferably 0.5 $\mu$m or less and more preferably 0.1 $\mu$m or less. As its secondary particle size, 50 $\mu$m or less is desirable. As a matter of course, such zeolite can be supported on a carrier or formed into a granular shape using an appropriate binder.

In the presence of the aforementioned solid acid catalyst, hydration of a cyclic olefin is carried out by mixing a water phase and an oil phase containing the cyclic olefin. Examples of the cyclic olefin include cyclopentene, methylcyclopentenes, cyclohexene, methylcyclohexenes, cyclooctene and cyclododecene, of which a cycloalkene having a five- to eight-membered ring is preferred, and cyclohexene is particularly preferred. In addition, other organic substance may be present in the reaction system as a solvent or additive agent. Examples of said organic substance include oxygen-containing organic compounds such as benzoic acids, carboxylic acids, phenols, salicylic acids, alcohols, fluoroalcohols, ethers, esters and ketones, nitrogen-containing organic compounds such as amide compounds and nitrile compounds, sulfur-containing organic compounds such as thiols and sulfonic acids, halogen-containing organic compounds such as carbon halides, aliphatic hydrocarbons and aromatic hydrocarbons.

The hydration is carried out by mixing water with a cyclic olefin in the presence of a solid acid catalyst. Volumetric ratio of the oil phase to the water phase is generally from 0.01 to 10, preferably from 0.1 to 1. A case in which the raw material cyclic olefin or water becomes large excess compared to the other is not desirable, because separation of water phase and oil phase becomes poor and the reaction rate is also reduced. Also, weight ratio of the catalyst to the cyclic olefin is generally from 0.01 to 20, preferably from 0.05 to 5. Amount of the catalyst if too small would require a large reactor due to slow reaction rate and if too large would entail increased catalyst cost.

The hydration is carried out under a suspended condition, such as a condition in which an oil phase is dispersed as droplets in a continuous water phase, by mixing the water phase with the oil phase by agitation or the like means. The reaction mode may be either a batch system or a continuous system, but a continuous system is preferable because it shows greater effects of the present invention. Regarding the hydration conditions, the optimum reaction temperature range varies depending on the raw material cyclic olefin to be used, but it is desirable to carry out the reaction at an increased temperature of generally from 50 to 300° C., preferably from 70 to 200° C., more preferably from 80 to 160° C., most preferably from 100 to 140° C. Though the reaction pressure is not particularly limited, a pressure capable of keeping the cyclic olefin and water as liquid phases is desirable, which is generally from atmospheric pressure to 5 MPa, and it is more desirable to carry out the reaction under a pressure of particularly from 0.2 to 2 MPa. The reaction time or retention time is generally from 1 minute to 10 hours, preferably from 5 minutes to 5 hours. Also, it is desirable to maintain the hydration system under an atmosphere of an inert gas such as nitrogen, helium, hydrogen, argon or carbon dioxide. In that case, it is desirable to use an inert gas containing smaller amount of oxygen, and the oxygen content is generally 100 ppm or less, preferably 20 ppm or less.

In this hydration reaction, the water phase is separated from the oil phase when their mixing is weakened or stopped. In that case, the solid acid catalyst is mostly contained in the water phase, and the raw material cyclic olefin and the thus formed cyclic alcohol are mostly contained in the oil phase. Accordingly, as a method for recovering the formed cyclic alcohol of interest from the hydration reaction mixture, the reaction mixture is firstly separated into water phase and oil phase. The cyclic alcohol can be easily purified and recovered from the thus isolated oil phase by a known method such as distillation. After isolation of the cyclic alcohol, the residual liquid containing the raw material olefin can be recycled as the raw material of hydration reaction. In addition, the isolated water phase contains the catalyst.

The aforementioned hydration of cyclic olefin has a problem in that activity of the solid acid catalyst rapidly decreases with the progress of reaction. Thus, after separation of the water phase and oil phase, it is necessary to draw out at least a portion of the catalyst in the water phase separated from the reaction mixture and carry out regeneration treatment of the catalyst, for example, by the aforementioned conventional techniques. The present invention is characterized in that, in separating the water phase from the cyclic olefin hydration reaction mixture and regenerating the solid acid catalyst by recovering it from said water phase in the aforementioned manner, the method further includes a step in which the oil phase and the solid acid catalyst-containing water phase are separated from the hydration reaction mixture under a temperature condition of 40° C. or more.

Regarding the method for separating the hydration reaction mixture into oil phase and water phase at a temperature of 40° C. or more prior to the regeneration treatment, according to the present invention, it is desirable to employ a method in which a portion or entire part of the reaction mixture is drawn out from the hydration reactor continuously or intermittently and introduced into an oil water separator outside of the reactor, and the introduced reaction mixture is allowed to stand by keeping temperature in said oil water separator at 40° C. or more, thereby separating the water phase and oil phase. Also, in the case of a reactor equipped with an oil water separation function such as an oil water separation weir inside the reactor, it is possible to employ a method in which the water phase portion inside the oil water separation weir is drawn out by keeping inner part of the oil water separation weir inside the reactor at a temperature of 40° C. or more. The latter case, however, is not preferable because of the aptness to cause contamination of the water phase with the oil phase, so that it is better to carry out the separation operation again in an oil water separator outside the reactor, where temperature is maintained at 40° C. or more. In that case, the oil water separation in the second oil water separator arranged outside the reactor is also included within the scope of the present invention, with the proviso that the catalyst in said isolated water phase is subjected to regeneration.

The temperature for separating said oil phase and water phase must be 40° C. or more and preferably 75° C. or more, particularly preferably 95° C. or more. Upper limit of the temperature is generally 200° C. or less, preferably 150° C. or less, and the separation is generally carried out at a temperature similar to or lower than that of the hydration reaction. The temperature if unnecessarily low would cause significant reduction of the catalytic activity during repetition of the regeneration and if too high would cause reduction of selectivity as the catalyst and thereby entail aptness to generate side reactions.

By the way, when the hydration is carried out under atmospheric pressure or a compressed pressure, the oil water separation under atmospheric pressure which does not require a pressure vessel must generally be carried out with sufficient cooling of the reaction solution, in order to prevent rapid vaporization of liquids such as the raw material cycloolefin and water. When considered from this point of view, the idea of the present invention to carry out oil water separation at a high temperature of 40° C. or more is markedly specific. In addition, since the boiling point of cyclic olefins, particularly a cyclic olefin having about five- to eight-membered ring, is relatively low, loss of the cyclic olefin occurs at a high temperature. When considered from these points of view, the oil water separation at a too high temperature may be undesirable according to the present invention, so that it is practical to carry out the oil water separation at a temperature lower than that of the reaction temperature by a factor of, for example, 5° C. or more, preferably 10° C. or more. Particularly, when the oil water separation is carried out under atmospheric pressure, too high oil water separation temperature is not practical, so that it is desirable to set the temperature at 85° C. or less.

The following describes outline of the present invention further in detail with reference to the drawings.

Figure 2:
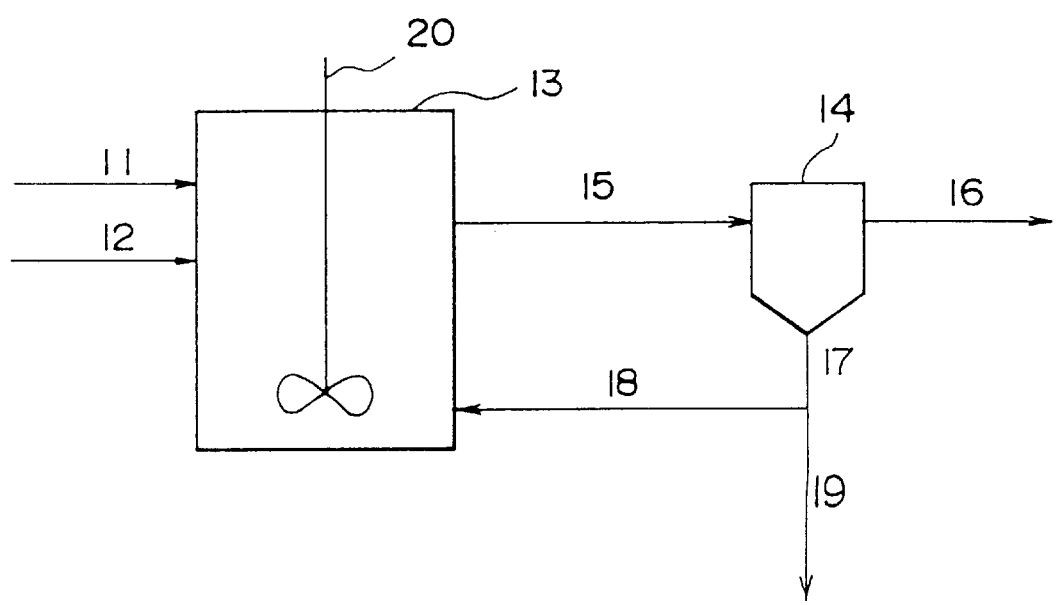
FIGS. 2, 3 and 4 are schematic illustrations showing examples of continuous hydration apparatuses which can be used in the method of the present invention. Symbols in FIGS. 2, 3 and 4 shown by corresponding numerals are in common with one another, in which 11 is a raw material feed pipe, 12 is a water feed pipe, 13 is a reactor, 14 is an oil water separator, 15 is at drawing pipe (of reaction mixture), 16 is a drawing pipe (of oil phase), 17 is a drawing pipe (of water phase), 18 and 19 are pipes, 20 is an agitator, 21 is an oil water separation weir and 22 is a drawing pipe (of oil phase).

FIG. 2 is a schematic illustration showing an example of the continuous hydration reactor which can be used in the method of the present invention. According to FIG. 2, a raw material cyclic olefin is fed from a raw material feed pipe 11 into a hydration reactor 13 which is charged in advance with a water phase containing a solid acid catalyst, while water is fed from a water feed pipe 12 into the hydration reactor 13. Said reactor 13 is equipped with an agitator 20, and the reaction progresses under a suspended condition of the water phase containing the solid acid catalyst with an oil phase containing the raw material cyclic olefin and the formed cyclic alcohol. A portion of the reaction mixture is drawn out from a pipe 15 and subjected to oil water separation in an oil water separator 14 at a temperature of 40° C. or more. The thus separated oil phase is drawn out from a pipe 16 and transferred to the subsequent step such as distillation for obtaining the cyclic alcohol. On the other hand, the water phase obtained by the oil water separation is drawn out from the bottom part through a pipe 17, and a portion thereof is returned into the reactor 13 through a pipe 18 and the rest is transferred to a regeneration step through a pipe 19. In this case, the ratio of the portion of the water phase obtained by oil water separation to be returned to the reactor and the portion thereof to be transferred to the regeneration step is optionally decided depending, for example, on the load and the amount of catalyst in the regeneration step. In consequence, it is possible to exclude the pipe 18. Also, the drawing into the pipe 18 or 19 can be carried out intermittently.

Figure 3:
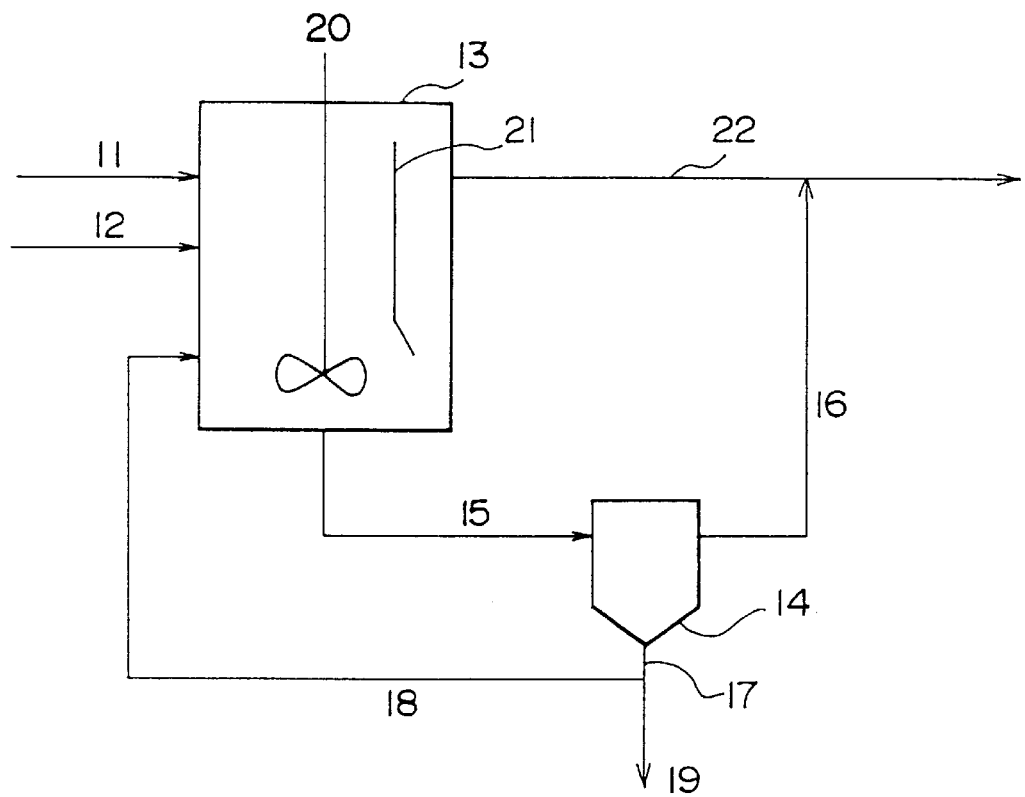

FIG. 3 is a schematic illustration showing another example of the continuous hydration reactor which can be used in the method of the present invention. The operation according to FIG. 3 is basically the same as the case of FIG. 2. The different point is that an oil water separation weir 21 is arranged in the reactor 13. The oil phase separated by the oil water separation weir 21 is drawn out from a pipe 22, and the reaction solution drawn out by the pipe 15 from the outside of the oil water separation weir in the reactor is separated by the oil water separator 14 similar to the case of FIG. 2 and transferred to the next step together with the oil phase drawn out through the pipe 16. In this case too, a portion of the water phase separated by the oil water separator 14 is returned into the reactor through the pipe 18, and the rest is subjected to regeneration through the pipe 19. The drawing into the pipe 18 or 19 may also be carried out intermittently.

Figure 4:
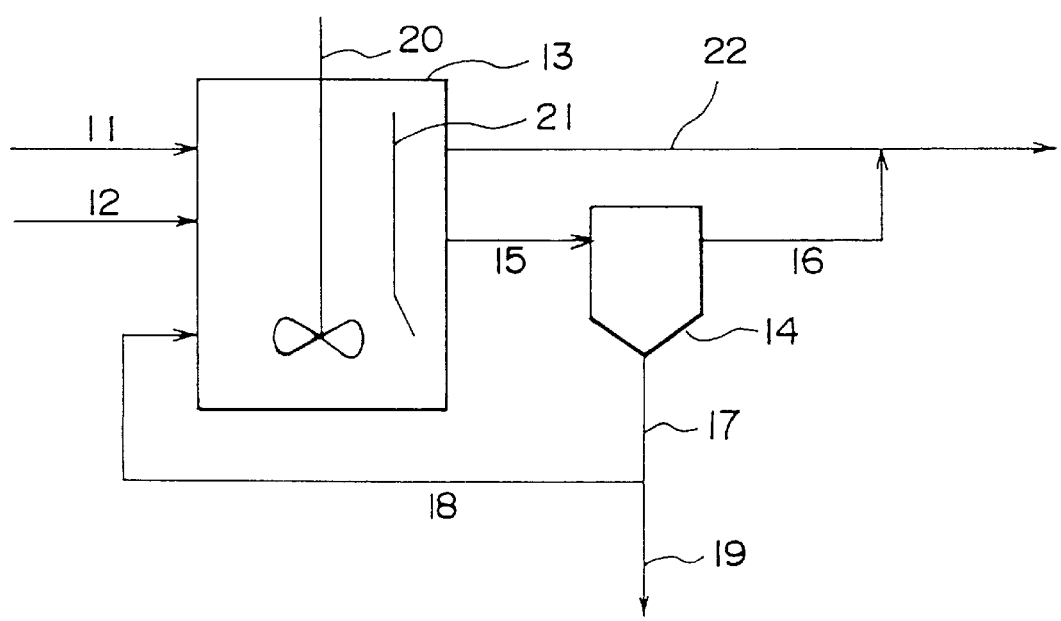

FIG. 4 is a schematic illustration showing still another example of the continuous hydration reactor which can be used in the method of the present invention. The operation according to FIG. 4 is basically the same as the case of FIG. 2. The different point is that the oil water separation weir 21 is arranged in the reactor also in FIG. 4, and the pipe 15 to be connected to the oil water separator 14 is also arranged on the oil water separation weir 21 side. Since oil water separation is carried out in the oil water separation weir 21 as described in the foregoing, the liquid drawn out from the bottom of the oil water separation weir 21 through the pipe 15 contains greater portion of the water phase without arranging the oil water separator 14, but it contains the oil phase in smaller amount than the water phase in many cases, so that the oil water separation is carried out again by the oil water separator 14. According to the method shown in FIG. 4, most of the reaction mixture to be fed to the oil water separator 14 is water phase in comparison with the method of FIG. 3, so that miniaturization of the oil water separator 14 and shortening of the standing time inside the separator can be achieved.

In all cases of FIGS. 2 to 4, connecting positions of the pipes to the reactor and the like are not particularly limited and can be optionally decided by those skilled in the art.

The catalyst is recovered for use in regeneration, generally by its filtration from the water phase separated by the method illustratively described in the above. The thus recovered catalyst is washed with water and dried as occasion demands and then subjected to a regeneration treatment.

Though the regeneration method of the catalyst isolated and recovered by the aforementioned method is not particularly limited, the following methods can be cited as preferred methods.

In the first preferred regeneration method of the solid acid catalyst, the solid acid catalyst recovered from the separated water phase is subjected to a baking treatment. Regarding the heating apparatus, it may be any generally used type such as a tube furnace or a muffle furnace, and preferred is a type which can carry out a fixed bed or fluidized bed gas contact operation generally by a gas flow method. This baking treatment of solid acid catalyst is carried out generally at a contact temperature of from 200 to 600° C. When the baking is carried out under a gas flow condition, the gas flow is generally from 0.25 to 50 $hr^{-1}$ as weight hour space velocity (WHSV) for the solid acid catalyst, and the contact time is generally from 1 minute to 100 hours, preferably from 5 minutes to 50 hours. It is desirable to remove moisture in the gas. The contact treatment may be either constant temperature treatment or variable temperature treatment, but variable temperature treatment is preferable. Regarding the variable temperature treatment, temperature may be changed continuously or stepwise by two or more steps, but a method in which the baking temperature is changed at the pre-step and post-step is preferable. Also, it is possible to carry out the regeneration efficiently, for example, by changing the oxygen concentration. It is more preferable to combine such variable temperature treatment and oxygen concentration changing treatment. For example, a method in which a low temperature treatment is carried out in an atmosphere of relatively low molecular oxygen concentration at the pre-step and a high temperature treatment is carried out in an atmosphere of relatively high molecular oxygen concentration at the post-step can be cited as an advantageous method. Regarding the preferred contact treatment conditions in this case, a method can be exemplified in which the contact treatment is carried out with an inert gas such as nitrogen containing 1% or less molecular oxygen at a temperature of from 80 to 500° C. and then with the gas containing 5% or more molecular oxygen at a more higher temperature (generally 400° C. or more).

A method in which the solid acid catalyst is firstly contacted with nitrogen at a temperature of from 100 to 450° C. and then contacted with a gas containing molecular oxygen at a temperature of from 400 to 600° C. can be exemplified as a preferred mode of such a baking method. In this case, it is desirable that the temperature for the contact treatment with nitrogen is lower than the temperature for the contact treatment with molecular oxygen. When the catalyst is contacted with nitrogen to reduce organic matter on the catalyst in advance and then treated with a molecular oxygen-containing gas at more higher temperature, the organic matter adhered to the catalyst can be removed more efficiently.

The pressure for the treatment is generally atmospheric pressure, but the treatment may also be carried out under a reduced pressure or a compressed pressure.

The thus regenerated catalyst by the above baking treatment may be directly recycled in the hydration reaction or after its treatment with an aqueous solution of an alkaline inorganic salt such as sodium hydroxide. By the contact treatment with an alkaline aqueous solution, delicate structural changes of the solid acid catalyst slightly generated by the baking treatment can be repaired and the regeneration effect can therefore be further improved. Since the catalyst after said alkaline aqueous solution treatment is ion-exchanged with the cationic species originated from the alkaline aqueous solution, an ion exchange treatment with a desired ionic species may further be carried out as occasion demands.

In addition, the method described in JP-A-61-234946 in which zeolite is firstly exchanged with an alkali metal ion and then contacted with a molecular oxygen-containing gas at a temperature of from 200 to 600° C. can also be exemplified as a preferred regeneration method.

Next, the second preferred regeneration method of the solid acid catalyst is a method described for example in JP-A-61-234945, in which the solid acid catalyst recovered from the separated water phase is treated with an oxidizing agent in a liquid phase. Illustratively, the catalyst obtained from the water phase isolated from the hydration reaction mixture by the aforementioned method is treated by allowing it to exist together with an oxidizing agent in the same liquid phase. Examples of the oxidizing agent include hydrogen peroxide, ozone, an organic acid peroxide, nitric acid and nitrous acid, of which hydrogen peroxide and ozone are preferred. Amount of the oxidizing agent to be used varies depending on the decreasing condition of the catalytic activity, but it is generally from 0.01 to 20 as the weight ratio of the oxidizing agent to the catalyst. Also, concentration of the oxidizing agent is generally from 0.001 to 70% by weight, preferably from 0.1 to 40% by weight, based on the liquid phase. Regarding the treatment conditions, the contact treatment is generally carried out in a polar solvent solution such as water of pH 13 or less at a temperature of from 20 to 120° C. for a period of approximately from 15 minutes to 50 hours. After completion of the oxidizing agent treatment, the catalyst may be washed with water and dried as occasion demands.

Also, as described in JP-A-3-224633, it is effective to employ a method in which the catalyst after said oxidizing agent treatment in a liquid phase is contacted with an inorganic alkali aqueous solution and then with an inorganic acid, thereby effecting ion exchange of the alkali metal ion type catalyst into acid type (H type).

The catalyst after said regeneration treatment is made into water slurry and again fed into the hydration reactor.

According to the present invention, separation of the water phase containing a catalyst and the oil phase is carried out at a high temperature of 40° C. or more, in obtaining the catalyst prior to the aforementioned regeneration treatment, which exerts such effects that separation of said water phase and oil phase can be made easily and the regeneration of catalyst thereafter can be carried out efficiently.

Among these effects, the reason for the efficient regeneration of catalyst is not clear, but roughly the following phenomena can be considered. In the hydration reaction of cyclic olefin, existing amount of each of the components which form the oil phase has an equivalent relation among three phases, namely oil phase-water phase-catalyst surface. These oil phase-forming organic components generally have a tendency to be greatly distributed into the oil phase than the catalyst surface as the temperature becomes high. Accordingly, even in the same reaction mixture, the amount of adhered organic substances on the catalyst in the water phase after separation of the oil phase varied depending on the oil phase separation temperature. In general, mixing of the reaction mixture is weakened or stopped in separating the oil phase and water phase, so that a situation can be considered that the organic substances once adhered to the catalyst surface are not easily re-extracted into the oil phase. In consequence, such organic substances are present on the catalyst in a high concentration, so that they are apt to undergo reactions such as dimerization and oligomerization and also apt to be adsorbed irreversibly, namely to accumulate on the catalyst. In addition, the thus accumulated organic substances cannot easily be removed by generally known regeneration methods such as the aforementioned regeneration methods. As a result, in the case of a high temperature treatment in the presence of molecular oxygen for example, they cannot be completely removed by burning or thermal decomposition and remain on the catalyst as the so-called cokes, and in the case of a hydrogen peroxide treatment in a liquid phase, they cannot undergo sufficient oxidative decomposition and therefore are strongly adsorbed on the catalyst as carbonyl type intermediates. Thus, when the use and regeneration of the catalyst are repeated, the aforementioned organic substances remained due to their incomplete removal are gradually accumulated on the catalyst and cause reduction of the catalytic activity. According to the present invention, regeneration efficiency of the catalyst is improved by reducing the amount of adhered organic substances on the catalyst to a level as small as possible through stimulation of the distribution of organic components into oil phase, which is effected by increasing the temperature at the time of oil water separation to a high level of 40° C. or more.

In this connection, the present invention is characterized in that the temperature is maintained at a high level of 40° C. or more when oil water separation is carried out for recovering the catalyst to be regenerated from the reaction solution (reaction mixture), and the oil water separation at a high temperature of 40° C. or more is also desirable when oil water separation is carried out for other purposes than the regeneration treatment, such as a case of oil water separation in which entire portion of the separated catalyst is recycled in the reactor, because the regeneration treatment can be carried out more efficiently.

EXAMPLES

The following illustratively describes the present invention with reference to inventive and comparative examples, though the invention is not restricted by the following examples unless overstepping its scope.

Inventive Example 1
(Continuous Flow Hydration of Cyclohexene)

Hydration of cyclohexene was carried out using the continuous hydration apparatus shown in FIG. 1. That is, a 2,000 ml capacity stainless autoclave reactor 3 equipped with an agitator was charged with 100 g of H type gallium silicate ($SiO_2/Ga_2O_3$ molecular ratio=50/1) as the hydration catalyst and 250 g of water, and the atmosphere in the system was replaced with nitrogen gas. While stirring the mixture at 500 rpm, inside of the reactor 3 was heated to a reaction temperature of 120° C. and then cyclohexene was fed from the feed pipe 1 at a rate of 120 g/hr. The reaction solution is separated into an oil phase and a water phase containing the catalyst in the 30 ml capacity oil water separation weir 4 arranged in the reactor, and then the oil phase alone is drawn out from the overflow pipe 5. Also, the amount of water in the reactor 3 was constantly maintained by feeding from the feed pipe 2 a total amount of the water consumed by the hydration reaction and the water flowed out as a dissolved component of the oil phase fran the overflow pipe 5. The concentration of cyclohexanol in the drawn out oil phase was 12.5% by weight, 5 hours after the commencement of the feed of raw material cyclohexene. Also, the cyclohexanol concentration in the flowed out oil phase after 200 hours was 9.8% by weight.

(Oil Phase/water Phase Separation of Reaction Mixture)

After 200 hours of the above continuous flow reaction, feed of cyclohexene and water into the reactor was stopped. While keeping at 120° C., the reaction mixture was drawn out from the reaction mixture output port 6 arranged on the reactor bottom, introduced into an oil water separator separately arranged outside of the reactor (not shown in the drawing) and then, while keeping at an inner liquid temperature of 120° C., separated into an oil phase and a water phase containing the catalyst in the oil water separator. In this case, contamination of the separated oil phase with the catalyst was not found.

(Regeneration of Catalyst—Gas Phase Oxidation Treatment)

The catalyst in the water phase separated in the above step was collected by filtration, washed with water and then dried at 110° C. The thus dried catalyst was packed in a quartz glass tube and baked at 300° C. for 1 hour while flowing nitrogen gas of 99.999% purity at a flow rate of 90 NL/hr under atmospheric pressure. Thereafter, the flowing gas was changed from nitrogen to dry air and 2 hours of baking was carried out at 540° C.

(Continuous Flow Reaction by First Regeneration Catalyst)

Continuous hydration reaction was carried out under the same conditions of the aforementioned (continuous flow hydration of cyclohexene), except that the regenerated catalyst. Cyclohexanol concentration in the oil phase drawn out after 5 hours of the continuous flow reaction using the regenerated catalyst is shown in Table 1. The activity was completely restored.

(Repetition of Reaction and Regeneration Operation)

The first regeneration catalyst described above was subjected to 200 hours of the reaction under the same conditions of the aforementioned step (continuous flow hydration of cyclohexene). After the reaction, the oil phase was separated in the same manner as described in the aforementioned step (oil phase/water phase separation of reaction mixture), and then the catalyst in the water phase was collected by filtration, washed with water, dried and then regenerated in the same manner as described in the aforementioned step (regeneration of catalyst—gas phase oxidation treatment). This continuous flow hydration-regeneration process was repeated 9 times in total. Contamination of the separated oil phase with the catalyst was not found in any of these repetitions.

(Continuous Flow Reaction by Catalyst After Repetition of Reaction and Regeneration)

Using the catalyst after repetition of continuous flow hydration-regeneration (catalyst after 10 times of regeneration counting from the fresh catalyst), the hydration reaction was carried out under the same conditions as described in the aforementioned step (continuous flow reaction by regenerated catalyst). Cyclohexanol concentration in the oil phase drawn out after 5 hours of the continuous flow reaction using the regenerated catalyst is shown in Table 1.

Inventive Example 2

The procedure of Inventive Example 1 was repeated except that the liquid temperature in the oil water separator of Inventive Example 1 was changed to 80° C. Contamination of the separated oil phase with the catalyst was not found in each case. Cyclohexanol concentration in the oil phase drawn out after 5 hours of the continuous flow reaction using the 1st or 10th regeneration catalyst is shown in Table 1.

Comparative Example 1

The procedure of Inventive Example 1 was repeated except that the liquid temperature in the oil water separator of Inventive Example 1 was changed to 30° C. In this case, contamination of the separated oil phase with a small amount of the catalyst was found. Cyclohexanol concentration in the oil phase drawn out after 5 hours of the continuous flow reaction using the 1st or 10th regeneration catalyst is shown in Table 1.

TABLE 1

| | Cyclohexanol conc. (wt %) | | Oil phase/ water phase |
|---|---|---|---|
| | After 1 regeneration | After 10 regeneration | separation temp. (° C.) |
| Inventive Ex. 1 | 12.5 | 11.8 | 120 |
| Inventive Ex. 2 | 12.4 | 11.6 | 80 |
| Comparative Ex. 1 | 12.4 | 8.7 | 30 |

Inventive Example 3

The procedure of Inventive Example 1 was repeated except that the (regeneration of catalyst—gas phase oxidation treatment) of Inventive Example 1 was changed to the following (regeneration of catalyst—liquid phase oxidizing agent treatment). Cyclohexanol concentration in the oil phase drawn out after 5 hours of the continuous flow reaction using the 1st or 10th regeneration catalyst is shown in Table 2.

(Regeneration of Catalyst—Liquid Phase Oxidation Treatment)

The catalyst in the water phase was collected by filtration and washed with water, and the catalyst after reaction and recovery and 180 ml of water were put into a 1,000 ml capacity glass autoclave and heated to 70° C. while stirring. Thereafter, 350 ml of 30% hydrogen peroxide aqueous solution was added in small portions thereto, and the mixture was stirred at 70° C. for 5 hours. The catalyst after this treatment was collected by filtration, washed with water and then dried.

Inventive Examples 4 and 5

The procedure of Inventive Example 3 was repeated except that the liquid temperature in the oil water separator of Inventive Example 3 was changed as shown in Table 2. Cyclohexanol concentration in the oil phase drawn out after 5 hours of the continuous flow reaction using the 1st or 10th regeneration catalyst is shown in Table 2.

Comparative Example 2

The procedure of Inventive Example 3 was repeated except that the liquid temperature in the oil water separator of Inventive Example 3 was changed to 30° C. Cyclohexanol concentration in the oil phase drawn out after 5 hours of the continuous flow reaction using the 1st or 10th regeneration catalyst is shown in Table 2.

TABLE 2

| | Cyclohexanol conc. (wt %) | | Oil phase/ water phase |
|---|---|---|---|
| | After 1 regeneration | After 10 regeneration | separation temp. (° C.) |
| Inventive Ex. 3 | 12.4 | 11.9 | 120 |
| Inventive Ex. 4 | 12.5 | 11.7 | 80 |
| Inventive Ex. 5 | 12.5 | 10.9 | 50 |
| Comparative Ex. 2 | 12.4 | 8.8 | 30 |

INDUSTRIAL APPLICABILITY

According to the present invention, solid acid catalysts (preferably zeolite) used in the hydration of cyclic olefins, particularly in a reaction in which cyclohexene is hydrated in a liquid phase to produce its corresponding cyclic alcohol, can be separated from the reaction solution and regenerated efficiently. The inventive method is particularly suitable for a case in which hydration of a cyclic olefin is carried out for a prolonged period of time by repeating regeneration and use of the catalyst again and again.

What is claimed is:

1. A method for producing a cyclic alcohol by carrying out continuous reaction of a cyclic olefin with water, which comprises the steps of:
   (1) forming a reaction mixture by mixing a water phase containing a solid acid catalyst with an oil phase containing a cyclic olefin and a cyclic alcohol;
   (2) drawing out the reaction mixture continuously from a reactor and carrying out oil water separation at a temperature of 40° C. or more; and
   (3) subjecting at least a portion of the solid acid catalyst in the water phase obtained by the oil water separation to a regeneration treatment.

2. A method for producing a cyclic alcohol by carrying out continuous reaction of a cyclic olefin with water, which comprises the steps of:
   (1) forming a reaction mixture by mixing a water phase containing a solid acid catalyst with an oil phase containing a cyclic olefin and a cyclic alcohol in a reactor having an oil water separation function inside thereof;
   (2) drawing out the oil phase separated in the reactor continuously from the reactor;
   (3) separately from the oil phase drawing of step (2), drawing out the reaction mixture continuously from the reactor and carrying out oil water separation at a temperature of 40° C. or more; and
   (4) subjecting at least a portion of the solid acid catalyst in the water phase obtained by the oil water separation of step (3) to a regeneration treatment.

3. A method for producing a cyclic alcohol by carrying out continuous reaction of a cyclic olefin with water, which comprises the steps of:
  (1) mixing a water phase containing a solid acid catalyst with an oil phase containing a cyclic olefin and a cyclic alcohol in a reactor having an oil water separation function inside thereof;
  (2) drawing out the oil phase separated at a temperature of 40° C. or more in the reactor continuously from the reactor;
  (3) drawing out the water phase which contains oil phase components, crudely separated at a temperature of 40° C. or more in the reactor, from the reactor;
  (4) carrying out oil water separation of the oil phase component-containing water phase drawn out from the reactor in step (3), further at a temperature of 40° C. or more; and
  (5) subjecting at least a portion of the solid acid catalyst in the water phase obtained by the oil water separation of step (4) to a regeneration treatment.

4. A method for regenerating a cyclic olefin catalyst, said method comprising:
  removing, at temperature of 40° C. or more, at least a portion of a reaction mixture from a hydration reaction, said reaction mixture obtained by mixing a water phase containing a solid acid catalyst and a oil phase containing a cyclic olefin,
  separating the at least a portion of a reaction mixture into a separated oil phase and a separated water phase at a temperature of 40° C. or more, and subsequently
  subjecting at least a portion of said solid acid catalyst in said separated water phase to a regeneration treatment;
  wherein said portion of said reaction mixture is maintained at a temperature of 40° C. or more and said cyclic olefin catalyst is regenerated after effecting said hydration reaction.

5. The regeneration method according to claim 4, wherein the solid acid catalyst recovered from the separated water phase is subjected to a baking treatment.

6. The regeneration method according to claim 5, wherein the baking treatment is carried out at a contact temperature of from 200 to 600° C., in a flow of a molecular oxygen-containing gas, an inert gas or a mixed gas thereof, at a gas flow rate of from 0.25 to 50 hr$^{-1}$ as a weight hour space velocity (WHSV) to the solid acid catalyst and for a gas contact time of from 1 minute to 100 hours.

7. The regeneration method according to claim 5, wherein the baking method is carried out by contacting the solid acid catalyst firstly with nitrogen at a temperature of from 100 to 450° C. and then with a gas containing molecular oxygen.

8. The regeneration method according to claim 4, wherein the solid acid catalyst recovered from the separated water phase is treated with an oxidizing agent in a liquid phase.

9. The regeneration method according to claim 8, wherein the oxidizing agent treatment is carried out using hydrogen peroxide or ozone as the oxidizing agent, at a weight ratio of the oxidizing agent to the catalyst of from 0.01 to 20, at a concentration of the oxidizing agent in a water-containing liquid phase of from 0.001 to 70% by weight based on the liquid phase, at a temperature of from 20 to 120° C. and for a period of from 15 minutes to 50 hours.

10. The regeneration method according to claim 4, wherein the solid acid catalyst is a zeolite.

11. The regeneration method according to claim 4, wherein the cyclic olefin is cyclohexene.

12. The regeneration method according to claim 4, wherein the hydration reaction is carried out by a continuous method.

13. The regeneration method according to claim 4, wherein a volumetric ratio of the oil phase to the water phase in the hydration reaction is from 0.01 to 10.

14. The regeneration method according to claim 4, wherein a weight ratio of the catalyst to the cyclic olefin is from 0.01 to 20.

15. The regeneration method according to claim 4, wherein the hydration reaction is carried out under a pressure and at an increased temperature.

16. The regeneration method according to claim 4, wherein the hydration reaction is carried out at a reaction temperature of from 80 to 160° C., under a reaction pressure of from 0.23 to 2 Mpa, for a period, as a reaction time or a retention time of the reaction solution in a reactor in which said hydration reaction occurs, of from 5 minutes to 5 hours and in an inert gas atmosphere having an oxygen content of 20 ppm or less.

17. The regeneration method according to claim 4, wherein the regeneration treatment is carried out on at least a portion of the catalyst drawn from the separated water phase.

18. The regeneration method according to claim 4, wherein the temperature for separating the water phase containing the solid acid catalyst from the oil phase is from 95 to 150° C. and is lower than a hydration temperature.

* * * * *